United States Patent [19]

Young et al.

[11] 3,733,673
[45] May 22, 1973

[54] HEAT-EXCHANGE CORE ASSEMBLY MACHINE

[75] Inventors: Fred M. Young; Ronald E. Jones, both of Racine, Wis.

[73] Assignee: Young Radiator Company, Racine, Wis.

[22] Filed: Nov. 29, 1971

[21] Appl. No.: 202,782

[52] U.S. Cl. .............................................. 29/202 R
[51] Int. Cl. ............................................. B23p 15/26
[58] Field of Search ........................ 29/202 R, 202 D, 29/200 B, 200 P

[56] References Cited

UNITED STATES PATENTS

| | | | |
|---|---|---|---|
| 2,093,202 | 9/1937 | Maynes | 29/202 D |
| 2,410,140 | 10/1946 | Young | 29/202 R |

Primary Examiner—Thomas H. Eager
Attorney—Arthur J. Hansmann

[57] ABSTRACT

An assembly machine for heat exchange cores and having a jig for holding a bank of core fins with rows of holes and a tube guide for slidably guiding tubes into the holes. A slide moves over the guide forcing the tubes into the holes, and the slide actuates a switch which causes the slide to retract and get set for engaging additional tubes and force them into other rows of holes. Also, the machine includes a switch and index means for aligning the tube guide with the rows of fin holes after the previous tube or tubes has been inserted into the holes. The index means includes horizontal and vertical indexing so that the guide can be aligned with all of the rows of fin holes. The guide has a nose which extends between the extending ends of the tubes in fins, and the nose has a guide slot or tunnel for closely guiding the tubes into the rows of holes.

18 Claims, 4 Drawing Figures

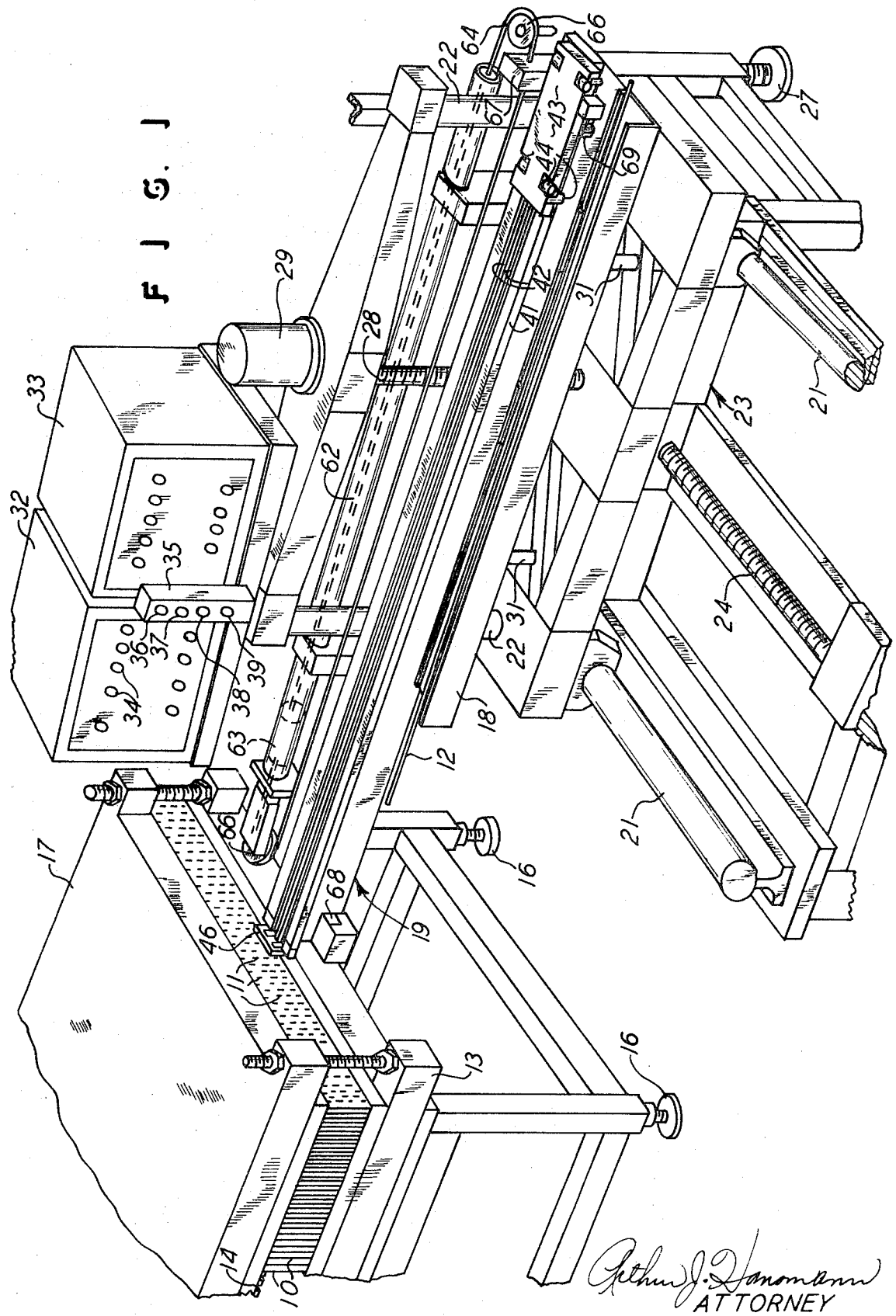

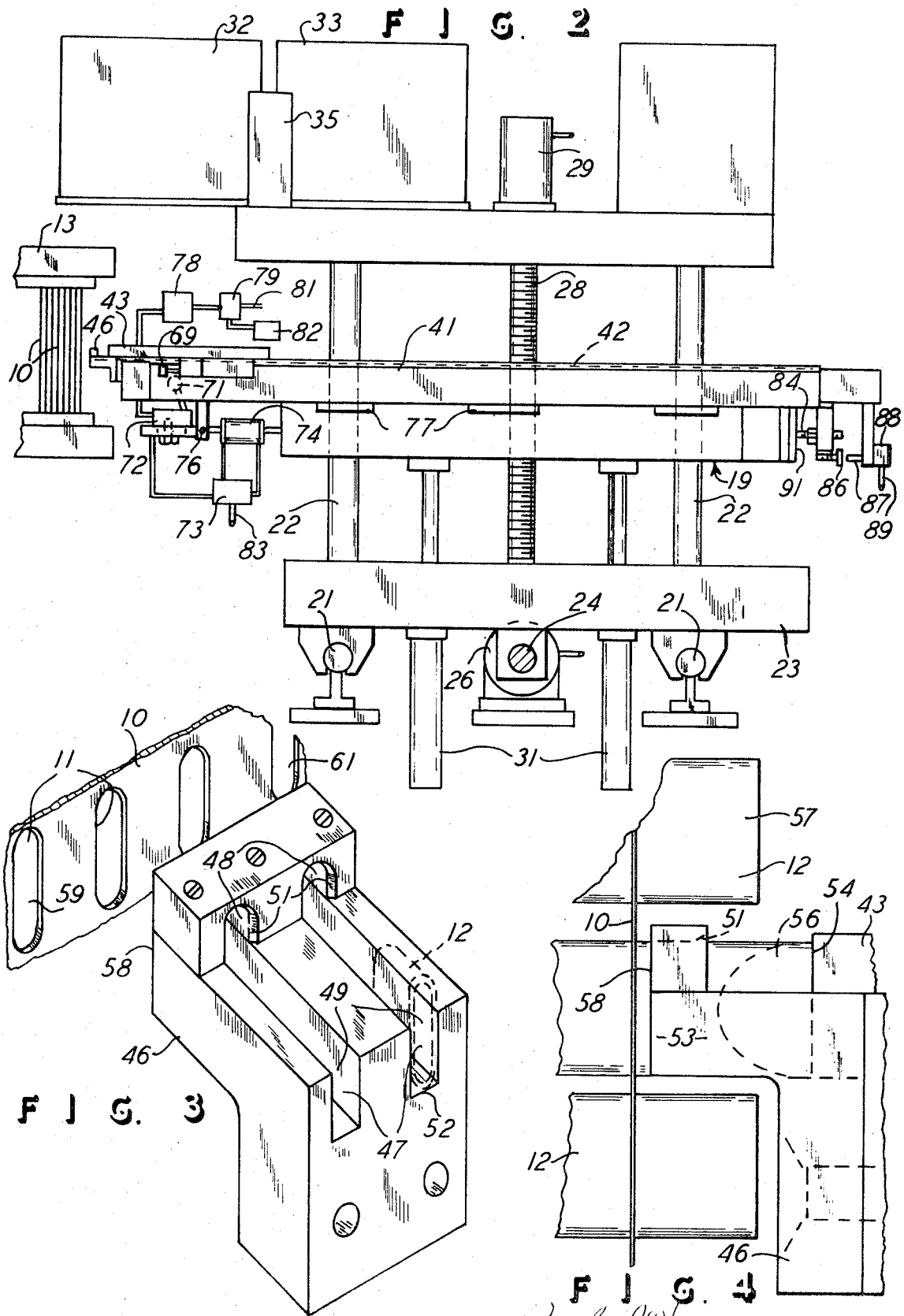

HEAT-EXCHANGE CORE ASSEMBLY MACHINE

This invention relates to a machine for assembling tubes in a bank of fins for forming a heat-exchanger core, and, more particularly, it pertains to a machine for assembling very large size heat-exchanger cores.

BACKGROUND OF THE INVENTION

In the manufacture of heat-exchanger cores where tubes are moved axially into aligned holes in fins, it is common knowledge that precise tube alignment and considerable force upon the tube are required in the assembly process. When this is done manually, there must be maximum manual force applied to the tube, and there must also be a very sensitive and accurate forcing of the tube into the aligned holes. In fact, there is a limit as to the size of the heat-exchanger core which can be assembled manually, and this limit is determined by the precision which even a skilled operator can produce and it is limited by the force which the operator can produce.

Beyond the aforementioned manual assembly of heat-exchanger cores, machine assembly of cores is already known. One example of a tube assembly machine is shown in U. S. Pat. No. 2,410,140. Another showing of an assembly machine is in U. S. Pat. No. 3,574,917. However, these two machines do not have the structure, versatility, nor the capacity of the machine of the present invention.

That is, the present invention is concerned with providing a core assembly machine wherein very large cores can be made, and this requires an extremely accurate and powerful machine which can guide a very long tube and force the very long tube into snug fit with a considerable plurality of fins having an aligned row of holes. That is, where the tube is of a great length, then the tube must be closely guided in the insertion process, and it must be very precisely aligned with the row of holes, and it must also be forcefully moved through the fins, and it must also be positioned to an exact degree of penetration of the fins. The present invention accomplishes all of these desirable and necessary attributes in order to form a large and sturdy and efficient heat-exchanger core.

A primary object and accomplishment of this invention is to provide apparatus for assembling a heat-exchanger core wherein long core tubes can be precisely positioned relative to the core fins, and the tubes can be adequately guided and forced into the holes in the fins, all to form a sturdy and efficient large heat-exchanger core. In accomplishing this object, the apparatus of this invention is arranged with automatically operating powered devices, such as pulse or stepping motors which displace the tube guide in small and accurate increments of movement for precise alignment of the tube with the rows of holes in the fins. Further, the movement of the working parts themselves cause the activation of the powered means for positioning the tube guide in the manner mentioned, and thus the apparatus is uniquely automatic in this regard.

Still another object and accomplishment of this invention is to provide apparatus of the nature mentioned and to do so with only a minimum of floor space and to have the apparatus arranged so that only one operator is required to monitor the running of the apparatus or machine. In accomplishing this object, an air cylinder is utilized as the powered means for forcing the tubes into the fin holes, and the cylinder is arranged and disposed adjacent the tube guide, so that there is no extended length of additional floor space required in the apparatus, and the cylinder is only of a length comparable to the length of the tube guide but yet serves the purpose of both forward and retracting movement of a pushing device operating on the tube.

Other objects and advantages will become apparent upon reading the following description.

BRIEF DESCRIPTION OF THE DRAWINGS

FIG. 1 is a perspective view of substantially a full showing of the apparatus of this invention.

FIG. 2 is a side elevational view of the apparatus shown in FIG. 1, and with parts added thereto.

FIG. 3 is an enlarged perspective view of the tube guide nose piece and a fragment of a fin, both as shown in FIG. 1.

FIG. 4 is a side elevational view of a fragment of the heat-exchange core and with a fragment of the guide shown positioning the center tube in the core.

DETAILED DESCRIPTION OF THE PREFERRED EMBODIMENT

The drawings show a bank of heat-exchanger core fins 10 which have holes 11 uniformly spaced along each of the plurality of fins 10 and forming rows of holes. A heat-exchanger tube 12 is insertable into a row of holes 11 to extend across the fins 10 and thereby form a large heat-exchanger core of the type which is already known.

The plurality of fins 10 are supported in a jig 13 which is shown to be provided with slots 14 for slidably receiving the fins 10 in the positions shown in FIGS. 1 and 2. The jig 13 is shown to be a supporting table which adequately presents the fins 10 in aligned and vertical positions, and the jig 13 also is shown to have vertical adjusting legs 16 to permit positioning of the jig 13 relative to the remainder of the apparatus shown and to be described. Also, the jig 13 has a top 17 which can be removed from the remainder of the jig 13 when the plurality of tubes 12 are inserted into the fins 10 to form the entire heat-exchanger core, and the assembled core can then be removed from the jig 13.

The tube 12 is shown to be of a long length and is supported in a storage bin 18 mounted on a movable bed 19. The bed 19 is movable in both the vertical and horizontal directions under powered devices to be described.

Thus the bed 19 includes all of the parts shown in FIGS. 1 and 2 and which are shown to be mounted on two spaced-apart rails 21, for horizontal movement of the bed 19, and the entire bed 19 is vertically moveable under the guidance of vertically disposed rails 22. Thus the bed 19 slides horizontally and vertically on the rails 21 and 22, respectively. To accomplish this, a lower support structure 23 is horizontally slidable on the rails 21 under the influence of a feed screw 24 which is suitably threaded into the support structure 23 for horizontal displacement of the ladder. FIG. 2 shows a motor 26 which is in driving relation with the screw 24 for powering the horizontal displacement described. FIG. 1 further shows additional table or support pieces below the lower support 23, such as the adjustable leg 27, and thus the entire apparatus is adjustably supported on the floor for adjustable elevation and horizontal alignment.

Further, the vertical rails or guide pins 22 are supported on the lower support 23 to move horizontally with the horizontal displacement of the support 23. However, the bed 19 is vertically guided by the rails or pins 22 under the influence of a vertically disposed feed screw 28 which is powered by a pulse or stepping motor 29, and this is like the motor 26 which is also a pulse or stepping motor, and both motors 26 and 29 are therefore capable of small increments of movement for precise horizontal and vertical displacement of the bed 19. That is, the feed screw 28 is suitably connected to the bed 19 for raising and lowering bed 19 according to rotation of the feed screw 28. Finally, the bed 19 has fluid cylinders 31 attached thereto in the spaced-apart positions shown, particularly in FIG. 2, and thus the leveling of the bed 19 can be achieved. The cylinders 31 are mounted on the lower support 23 and they extend upwardly into the supporting relation with the bed 19, as shown.

The motors 26 and 29 are shown to be electric, and a control box 32 controls the horizontal motor 26, and a control box 33 controls the vertical motor 29. That is, the boxes 32 and 33 have pluralities of control buttons 34 which the operator can push and thereby regulate the action of the respective motors for the desired degree or increment of movement of the table 19. Further, once the operator has depressed the desired button or buttons 34, the apparatus will automatically shift the bed 19 both vertically and horizontally, in cycles of operation as described hereinafter. The control boxes 32 and 33 are of standard equipment and electrical connections and of course are suitably connected to the respective motors 26 and 29 for energizing the latter, and the controls 32 and 33 are capable of increments of movement of the bed 19 in thousandths of an inch. Also, the boxes 32 and 33, and thus the motors 26 and 29, are under the control of a master control 35 which has suitable electric connections and a main off-on button 36 and a button 37 for powering the boxes 32 and 33 in the automatic index action described and there is a stop button 38 for the tube pusher to be described and a pusher start button 39. That is, the operator positions the tube 12 on the bed 19 and he then pushes the button 39 for mechanical insertion of the tube 12 into the fins 10, all in a manner to be made even more apparent hereinafter.

The bed 19 includes a guide 41 which has two elongated slots 42 on the upper surface thereof. The slots 42 are of a shape arranged to snugly receive the tube 12 and to thereby support the tube as the latter is forced into the fins 10. Thus, a slide or pusher 43 is arranged with rollers 44, both on the top and the sides of the slide 43, so that the slide 43 can easily and rapidly move back and forth over the guide 41, that is, it moves from the position shown in FIG. 1 and up to the position shown in FIG. 2 which is at the other end of the guide 41.

The guide 41 has a nose or front piece 46 which is removable from the remainder of the guide 41, and it presents two spaced apart grooves 47 which align with and are therefore extensions of the two grooves 44. Further, the piece 46 has two tunnels 48 which present close guides to the upper portion of the tube 12 moving through the slots and tunnels described. Also, the slots 47 are preferably wider at the inlet ends designated 49 than they are at the outlet ends adjacent the tunnels 48, so the tubes 12 can easily enter the slots 47 but are then more completely guided and confined for accurate positioning in the fin openings 11. Still further, the tunnels 48 have chamfered or tapered inlet ends 51 for further confining the tube 12 and thus precisely position the tube 12 for entering the holes 11. FIG. 3 shows a fragment of a tube 12, in dotted lines, relative to the slot 47, and it will be understood that the slot base 52 and the tunnel walls 48 will adequately confine the tube 12 for the very precise location and alignment of the tube 12 with the row of holes 11. With the piece 46 being removable as described, various sizes of nose pieces 46 could actually be used for various sizes of tubes 12, at least within limited variations in tube sizes.

The drawings also show, in particularly FIG. 4, that the piece 46 has an extended front end 53 which is of a size small enough to fit between the upper and lower tubes 12 in FIG. 4. Thus, FIG. 4 shows the piece 46 with the rear edge 54 of a tube 12 moving leftward through the piece 46 as it is understood that the slide 43 is abutting the tube edge 54, and a spear 56 extends from the slide 43 and into the opening in the tube 12 for transmitting force from the slide 43 and to the tube 12. The fin 10 shown in FIG. 4 is the first fin in the stack of fins, and it will be noted that the tubes 12 have extending ends 57 projecting from the first shown fin 10. The apparatus is arranged so that the tubes 12 can be inserted between adjacent rows of tubes 12, and the tubes 12 can be inserted to a selectable distance within the fins 10 to have extending ends 57 for the selected distance. These features are significant when it is realized that in forming a large heat-exchanger core it is important to insert the tubes 12 in a random pattern, that is, the tubes are preferably inserted in different spaced-apart locations in the core so that the tubes give support to the fins 10 during the assembly process. With this understanding, it is then significant that the nose piece 46 can extend between two adjacent rows of tubes 12, as shown in FIG. 4, and it is also significant that the forward-most side 58 of the piece 46 is very close to the first fin 10 so that optimum guidance and positioning of the tube 12 are obtained. Thus the surface 58 can be positioned to even one sixteenth of an inch from the fin 10, and this gives the accurate positioning and alignment to the tube 12 relative to the holes 11, and no buckling, misalignment, or other obstacle is encountered.

Further, with regard to the size of the nose piece 46, it will be understood that two tubes 12 are inserted simultaneously, and the piece 46 is sufficiently narrow so that it can assume the position shown in FIG. 4 even though a tube extends with its end 57 to each side of the piece 46, and this would be having a tube extend from each of the fin holes 59 and 61 of FIG. 3. That is, the end portion 53 of the nose 46 is of a cross-sectional height and width size less than the respective spacing between the fin holes 11 which are the closest on opposite sides of any holes 11 which are receiving the tubes 12. Therefore, after strategically positioning tubes within widely spaced-apart rows of fin holes 11 in the initial assembly, the guide 41 with its nose piece 46 can move sequentially along the rows of holes 11 and insert tubes in rows which are immediately adjacent the location of already inserted tubes. Of course, if the operator does not desire that action as described, or, if the operator does not place a tube 12 in both of the slots 42, then no tube would be inserted when the slide 43 is advanced.

The mechanism for reciprocating or power advancing and retracting the slide 43 is shown in FIG. 1. Thus there is shown a pneumatic cylinder 62 which is of a length substantially the same as the length of movement of the slide 43 along the guide 41. A piston 63 is shown dotted in the cylinder 62, and a cable 64 extends through the cylinder 62 and is connected to the piston 63 at both ends thereof, and the cable 64 extends outwardly along the side of the cylinder 62. Pulleys 66 are indicated in positions to support the cable 64 at opposite ends of the cylinder 62, and the cable 64 is fixedly connected to the slide 43, such as through a piece 67 on the slide 43. The entire arrangement is such that the cylinder 62 is subjected to air pressure, by any conventional means of an air pump and air lines extending to opposite ends of the cylinder 62 so that the latter is a conventional double-acting cylinder, and the piston 63 moves for the length of the cylinder 62 to carry the cable 64 and thus reciprocate the slide 43 on the guide 41. Of course the operator would control the movement of the piston 63, and he would therefore be controlling the insertion of the tubes 12 as the slide 43 moves from the FIG. 1 position to the FIG. 2 position and under the influence of the pneumatic system described and shown. It will also be understood that the pneumatic system described is horizontally and vertically displaceable along with the table 19.

Thus it should now be understood that when the operator pushes the start button 39, the electric components and the pneumatic system described operate to displace the slide 43 in the manner mentioned.

FIGS. 1 and 2 show a fixed stop 68 on the table 19, and there is an adjustable stop screw 69 on the slide 43 for aligning with the stop 68. Thus the two stop members abut when the slide 43 is fully advanced toward the fins 10, and this determines the depth to which the tubes 12 are inserted into the fins 10. As mentioned, the depth relationship is adjustable in that the stop screw 69 can be adjusted.

FIG. 2 shows an electric switch lever 71 in the path of the slide 43 to be actuated by the slide 43 when the latter almost reaches the fins 10. The lever 71 is on a switch 72 which is shown connected to a pneumatic pump 73 which in turn is connected to a pneumatic cylinder 74. Thus, upon tripping the lever 71, the cylinder 74 is actuated, and it will be noted that the cylinder 74 is connected to the guide 41 through a connection at 76. The guide 41 is slightly movable toward and away from the fins 10, and it is reciprocally supported as a part of the bed 19 by means of the guide blocks 77 so that it can move a short distance toward and away from the fins 10 and under the influence of the cylinder 74.

Thus, after the slide 43 is fully advanced and has inserted a tube 12, the slide 43 has tripped the lever 71 and that actuates the cylinder 74 and that retracts the guide 41 away from the fins 10. Simultaneously, the switch 72 is connected to a control 78 which in turn is connected to the pneumatic valve 79 having a line 81 extending to the cylinder 62 and being supplied by the pneumatic pump 82, all for reversing the piston 63 and thus repositioning the slide 43 to the FIG. 1 position of retraction. Also, the air pump 82 can connect to the air valve 73 through the line 83 so that cylinder 74 is a two-way cylinder by the two connections shown thereon, and the guide 41 is powered back and forth in the short movement described above.

FIG. 2 further shows that a threadedly adjustable stop 84 is on the rear end of the guide 41 and is in position to abut the remainder of the table 19 when the slide 41 moves forward, which is leftward in FIG. 2. This stop 84 therefore determines the position of the nose front surface 58 relative to the first fin 10, as seen in FIG. 4 and as mentioned above.

When the slide 41 is retracted, a projection 86 on the slide 41 engages a switch button 87 to actuate a switch 88. The switch 88 is connected to the control boxes 32 and 33 by the connection 89. Thus the slide 41 is automatically indexed to align with the next row of holes 11.

Thus, there is provided apparatus or a machine which has the powered means in the form of the pneumatic system described for forcing the tubes into the fins, and there is the indexing means, including the electric control boxes 32 and 33 and the electric motors 26 and 29, and there is the reciprocating means of the pneumatic cylinder 74 for moving the guide 41. Also, the slide 43 has its fixed stop 68, and the guide 41 has its fixed stop 91 abutted by the guide adjusting screw 84, and both stops are for limiting the forward motion of these pneumatically operative elements 43 and 41, as described. Still further, the electric connections and systems involving the buttons 34 and the energizing of the motors 26 and 29, beyond the actual showings in the drawings and beyond the word descriptions herein, are all of a conventional nature and therefore need not be further described, but their application in this particular apparatus is adequately described and is utilized in this particular apparatus.

What is claimed is:

1. In apparatus for inserting tubes into rows of holes in fins to form a heat exchanger core, a jig for holding a stack of fins having spaced-apart rows of aligned holes for receiving a tube, a tube guide for slidably guiding the tube into said holes, a powered means for forcing the tube along said guide and into said holes to position said tubes with ends extending a short distance out of said fins, and indexing means for moving said guide to sequentially register with said holes, the improvement comprising said guide having a tube-receiving slot extending for at least the length of said tube and snugly supporting said tube throughout the length of said tube, reciprocating means operatively associated with said guide for advancing and retracting said guide relative to said fins, said guide including a nose having a tunnel therethrough for receiving said tube and with said nose completely surrounding said tube, and said nose having an end portion of a cross-sectional size less than the spacing between the fin holes which are the closest on opposite sides of any fin holes which are receiving tubes, such that said end portion fits between said tube-extending ends during the insertion of said tubes and when said guide is in the advanced position toward said fins.

2. The apparatus as claimed in claim 1, wherein said nose is a piece separable from the remainder of said guide, and releasable fastening means between said nose piece and the remainder of said guide for releasably attaching said nose piece to said remainder.

3. The apparatus as claimed in claim 1, wherein said nose tunnel is aligned with said tube-receiving slot of said guide, and said nose having a tube-receiving slot contiguous to said slot of the remainder of said guide, and with said nose slot being tapered downwardly toward said fins for closely guiding said tubes int said fin holes.

4. The apparatus as claimed in claim 1, including a slide included in said powered means and movable along said guide tube-receiving slot, and rollers on said slide for movably mounting said slide on said guide.

5. The apparatus as claimed in claim 1, including a switch mounted in the path of movement of said slide for actuation in accordance with slide movement, said reciprocating means including a motor, and said switch being connected to said motor for actuation of said reciprocating means in the advancing and retracting of said guide relative to said fins.

6. The apparatus as claimed in claim 5, including a limit stop operative on said slide for limiting the movement of said slide relative to said guide and toward said fins, for insertion of said tubes to a limit position into said fins.

7. The apparatus as claimed in claim 6, including an adjustment mounting for said limit stop for selectively limiting the extent of insertion of said tubes into said fins.

8. The apparatus as claimed in claim 1, including an adjustable limit stop operative on said reciprocating means and in the path of movement of the latter toward said fins for limiting the advance and positioning of said nose toward said fins.

9. The apparatus as claimed in claim 1, wherein said index means includes a mounting for movably supporting said guide for movement of said guide in the direction transverse to the axes of said rows of said fin holes, and additional powered means operatively connected to said mounting for power-moving said mounting to align said guide slot with said fin holes.

10. The apparatus as claimed in claim 9, wherein said mounting includes a track for movement of said guide in both the horizontal and the vertical directions.

11. The apparatus as claimed in claim 4, wherein said powered means includes a fluid cylinder extending with its axis parallel to said guide slot for substantially the length of said guide slot, a piston slidable in said cylinder and a cable connected to said piston and said slide for powered reciprocation of said slide.

12. In apparatus for inserting tubes into rows of holes in fins to form a heat exchanger core, a jig for holding a stack of fins having spaced-apart rows of aligned holes for receiving a tube, a tube guide for slidably guiding the tube into said holes, a powered means for forcing the tube along said guide and into said holes to position said tubes with ends extending a short distance out of said fins, and indexing means for moving said guide to sequentially register with said holes, the improvement comprising said guide having a tube-receiving slot extending for at least the length of said tube and snugly supporting said tube throughout the length of said tube, reciprocating means operatively associated with said guide for advancing and retracting said guide relative to said fins, a slide included in said powered means for reciprocating movement on said guide and engagable with said tube for the forcing of said tube into said holes, a switch disposed in the path of movement of said slide and being actuated by said slide when said slide is reciprocated toward said fins, a power unit connected to said switch and being energized through said switch and being operatively connected to said slide for automatically retracting said slide from said fins and to ready said slide for the insertion of another said tube into said fins.

13. The apparatus as claimed in claim 12, wherein said reciprocating means for said guide is operatively connected to said switch for energizing said reciprocating means automatically through said switch.

14. The apparatus as claimed in claim 12, including a limit stop operative on said slide for limiting the movement of said slide relative to said guide and toward said fins, for insertion of said tubes to a limit position into said fins.

15. The apparatus as claimed in claim 14, including an adjustment mounting for said limit stop for selectively limiting the extent of insertion of said tubes into said fins.

16. The apparatus as claimed in claim 12, wherein said index means includes a mounting for movably supporting said guide for movement of said guide in the direction transverse to the axes of said rows of said fin holes, and additional powered means operatively connected to said mounting for power-moving said mounting to align said guide slot with said fin holes.

17. The apparatus as claimed in claim 16, wherein said mounting includes a track for movement of said guide in both the horizontal and the vertical directions.

18. The apparatus as claimed in claim 12, wherein said powered means includes a fluid cylinder extending with its axis parallel to said guide slot for substantially the length of said guide slot, a piston slidable in said cylinder and a cable connected to said piston and said slide for powered reciprocation of said slide.

* * * * *